Jan. 6, 1959   H. A. WINTERMUTE   2,867,573
PRODUCTION OF OXIDIZING LIQUIDS
Filed Aug. 7, 1956
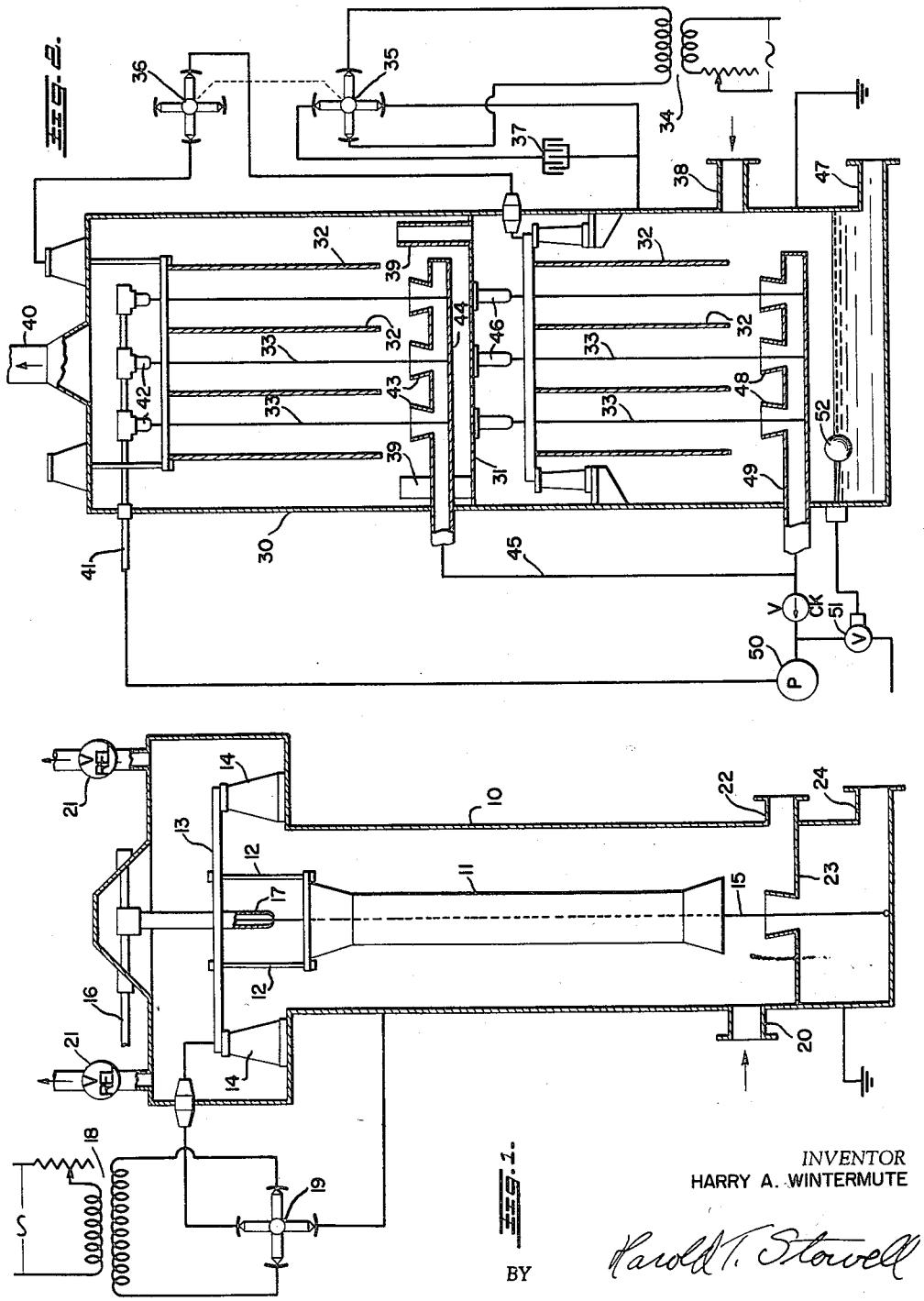
INVENTOR
HARRY A. WINTERMUTE
BY
ATTORNEY United States Patent Office 2,867,573
Patented Jan. 6, 1959

2,867,573

PRODUCTION OF OXIDIZING LIQUIDS

Harry A. Wintermute, Plainfield, N. J., assignor to Research Corporation, New York, N. Y., a corporation of New York Application August 7, 1956, Serial No. 602,636

3 Claims. (Cl. 204—164)

This invention relates to the method for the production of aqueous liquids having a high oxidizing potential.

The method of the invention comprises passing an oxygen-containing gas between complementary discharge and non-discharge electrodes and supplying a stream of water or other aqueous liquid to the discharge electrode while maintaining across said electrodes an electrical potential effective to cause corona discharges from the discharge electrode and to spray at least a portion of the aqueous liquid into the interelectrode space.

The particles of liquid thus sprayed into intimate contact with an oxygen-containing gas in the presence of the ionizing (corona) discharge acquire a high oxidizing potential by absorption of active forms of oxygen produced under the conditions of the treatment. The treated liquid may be collected and utilized in various chemical and biological oxidation processes. When an excess of liquid is supplied to the discharge electrode over the amount which is sprayed therefrom in passing through the apparatus, which is desirable in order to obtain the maximum capacity from the apparatus, it is advantageous to collect the liquid which is not sprayed from the electrode separately. The separately collected unsprayed liquid may be returned to the supply to the discharge electrode or passed to waste.

The oxygen-containing gas supplied to the process may be atmospheric air, air enriched with oxygen or substantially pure oxygen. When atmospheric air or oxygen enriched air is used provision is made for passing the air in a stream through the interelectrode space by suitable inlet and outlet means. When substantial pure oxygen is used it is only necessary to supply fresh oxygen at the rate at which the gaseous oxygen is consumed in the process.

Typically the interelectrode spacing is about three to six inches. The power supplied to the electrodes is maintained at the maximum voltage which does not result in undue interelectrode arcing and will normally be in the range of 50,000 to 60,000 volts. The discharge electrode is preferably maintained at negative polarity. The voltage may be supplied in the form of rectified alternating current, either full wave or alternate halfwaves, or in the form of direct current pulses of steep wave front.

Illustrative embodiments of apparatus suitable for carrying out the novel method of the invention will be described with particular reference to the accompanying drawing in which:

Fig. 1 is a diagrammatic sectional elevation of apparatus for effecting the principles of the invention; and Fig. 2 is a diagrammatic sectional elevation of a two-stage apparatus embodying the principles of the invention.

In Fig. 1, 10 is a casing enclosing an assembly of opposed electrodes consisting of a cylindrical collecting electrode 11 supported by means of rods 12 from bar 13 mounted on insulators 14. A discharge electrode 15 which may be a wire, a twisted rod or the like is suspended centrally in collecting electrode 11. Liquid supply conduit 16 supplies liquid to outlet nozzle 17 in which discharge electrode 15 is centrally located.

The electrodes are energized with high potential direct current from an energizing system including a high voltage transformer 18 and a rectifier 19. Oxygen-containing gas is supplied to the casing through inlet 20 and depleted gas may be removed through outlets 21. Treated liquid which has been sprayed from the discharge electrode by the action of the high potential interelectrode field is collected in the bottom of the casing and may be removed through outlet 22. Unsprayed liquid runs down the discharge electrode into the sump formed by partition 23 and may be removed through outlet 24.

The two-stage apparatus shown in Fig. 2 is similar in principle to that of Fig. 1. It comprises a casing 30, divided by partition 31 into upper and lower treating compartments each having an assembly of opposed collecting electrodes 32 and discharge electrodes 33 positioned therein. The electrode energizing system includes a high voltage transformer 34, a synchronous rotary spark gap 36 which operates to supply successive rectified half-waves of current alternately to the upper and lower sets of electrodes and in combination with condenser 37 to supply the successive half-waves in the form of pulses of steep wave front to effect a pulse energization of the electrodes.

Oxygen-containing gas is supplied to the lower compartment at 38, flows through the interelectrode space therein and thence into the upper compartment through conduits 39 and out through outlet 40.

Aqueous liquid supplied to the upper set of discharge eelctrodes through conduit 41 and outlet nozzles 42 is sprayed at least in part into the interelectrode space. The excess unsprayed liquid is caught in the funnel inlets 43 of collector manifolds 44 and drawn off into conduit 45. The sprayed liquid collects in the bottom of the upper compartment and flows into supply nozzles 46 around the discharge electrodes of the lower compartment. The liquid sprayed from the discharge electrodes of the lower compartment collects in the bottom of the lower compartment and may be drawn off through outlet 47. The excess unsprayed liquid is collected in funnel inlets 48 of manifolds 49 and passes to conduit 45. The liquid collected in manifolds 44 and 49 is returned to supply conduit 41 by means of pump 50. Fresh liquid is added to the system as required through valve 51 controlled by float 52.

It will be noted that the apparatus of Fig. 2 is very flexible and may be operated in a variety of ways by minor rearrangement of the supply and outlet fittings. Instead of feeding the treated liquid from the first stage into the second stage, nozzles 46 of the second stage may be supplied from conduit 41 so that the stages operate in parallel rather than in series, or nozzles 46 of the second stage may be fed, at least in part, by unsprayed liquid from manifolds 44 of the first stage, the sprayed liquid collected in the bottom of the first stage being passed directly to the sump in the bottom of the second stage or drawn off separately.

The oxidizing aqueous liquid obtained by the method of the invention provides an economical and efficaceous purifying and oxidizing agent. It can be used to prevent stream pollution, by oxidizing noxious substances or objectionable odors or destroying microorganisms in waste liquors before they are discharged into streams. It may be used to decrease the biological oxygen demand of polluted waters or to fortify streams against pollution by increasing their oxygen content.

The apparatus may be used to purify water for industrial or domestic use or for swimming pools as it provides an accelerated aeration and oxidation and also rapidly destroys bacteria and other microorganisms in water passed through the apparatus.

The oxidizing liquids may be used for various chemical oxidizing purposes, for example, for the oxidation of $SO_2$ in solution or in gaseous mixtures to $SO_3$. An advantageous application of this reaction involves the use of the oxidizing liquid in the conditioning of gases containing $SO_2$ for purification by electrical precipitation, the $SO_3$ thereby produced increasing the conductivity of the suspended solids in the gases and correspondingly increasing the efficiency of precipitation.

The oxidizing action of the liquid may also be applied in the apparatus by supplying to the discharge electrodes an aqueous liquid containing a substance to be oxidized such as $SO_2$ or an oxidizable contaminant.

I claim:

1. The method of providing an aqueous liquid having high oxidizing potential which comprises passing an oxygen-containing gas between complementary vertical discharge and non-discharge electrodes, the discharge electrode comprising a vertically suspended wire electrode adjacent said non-discharge electrode, supplying a stream of aqueous liquid along the surface of said vertically suspended discharge electrode, maintaining between said complementary electrodes an electrical potential effective to yield a corona discharge therebetween, said corona discharge effecting the spraying of at least a portion of said aqueous liquid from said discharge electrode surface into the interelectrode space, and recovering separately the unsprayed portion of the aqueous liquid from the sprayed portion having said high oxidizing potential.

2. The method as defined in claim 1 wherein the gas is substantially pure oxygen.

3. The method as defined in claim 1 wherein the aqueous liquid supplied to the discharge electrode has a substance to be oxidized dispersed therein.

References Cited in the file of this patent

UNITED STATES PATENTS

| | | |
|---|---|---|
| 1,958,406 | Darrah | May 15, 1934 |
| 2,089,793 | Hartman | Aug. 10, 1937 |
| 2,454,757 | Smith | Nov. 23, 1948 |
| 2,590,323 | Janser et al. | Mar. 25, 1952 |